(12) United States Patent
Lewander Xu et al.

(10) Patent No.: US 11,674,898 B2
(45) Date of Patent: Jun. 13, 2023

(54) SYSTEM AND METHOD FOR DETERMINING A GAS CONCENTRATION IN A CONTAINER

(71) Applicant: GasPorOx AB, Lund (SE)

(72) Inventors: Märta Lewander Xu, Lund (SE); Patrik Lundin, Harlösa (SE)

(73) Assignee: GasPorOx AB, Lund (SE)

( * ) Notice: Subject to any disclaimer, the term of this patent is extended or adjusted under 35 U.S.C. 154(b) by 4 days.

(21) Appl. No.: 17/281,938

(22) PCT Filed: Oct. 1, 2019

(86) PCT No.: PCT/EP2019/076665
§ 371 (c)(1),
(2) Date: Mar. 31, 2021

(87) PCT Pub. No.: WO2020/070173
PCT Pub. Date: Apr. 9, 2020

(65) Prior Publication Data
US 2021/0381966 A1 Dec. 9, 2021

(51) Int. Cl.
G01N 21/39 (2006.01)
G01N 21/41 (2006.01)

(52) U.S. Cl.
CPC ............. *G01N 21/39* (2013.01); *G01N 21/41* (2013.01); *G01N 2021/399* (2013.01)

(58) Field of Classification Search
CPC .. G01N 21/39; G01N 21/41; G01N 2021/399; G01N 21/31; G01N 21/35; G01N 21/3504

USPC ........................................................ 356/445
See application file for complete search history.

(56) References Cited

U.S. PATENT DOCUMENTS

| 2012/0194800 A1 | 8/2012 | Debreczeny |
| 2013/0258346 A1 | 10/2013 | Tondello |
| 2015/0300938 A1 | 10/2015 | Debreczeny et al. |
| 2017/0115264 A1 | 4/2017 | Kuhn et al. |

FOREIGN PATENT DOCUMENTS

| EP | 3208603 A1 | 8/2017 |
| WO | WO 2012/156589 A1 | 11/2012 |

OTHER PUBLICATIONS

Cocola, Lorenzo. "Tunable diode laser absorption spectroscopy for oxygen detection." (2012).
International Search Report and Written Opinion received in Application No. PCT/EP2019/076665, dated Nov. 18, 2019.
Office Action received in Swedish Application No. 1851175-8, dated Apr. 11, 2019.

Primary Examiner — Md M Rahman
(74) Attorney, Agent, or Firm — Knobbe, Martens, Olson & Bear, LLP

(57) ABSTRACT

An system and method is disclosed for determining a concentration of at least one gas in a container. The system and method includes detecting light reflected by a surface inside or behind the container, or light refracted or scattered by the container, with a detector, wherein the detector provides a first signal related to an intensity of the reflected light, and a second signal related to a position of reflected light being detected. The first and second signals are used for estimating a concentration of the at least one gas inside the container.

13 Claims, 5 Drawing Sheets

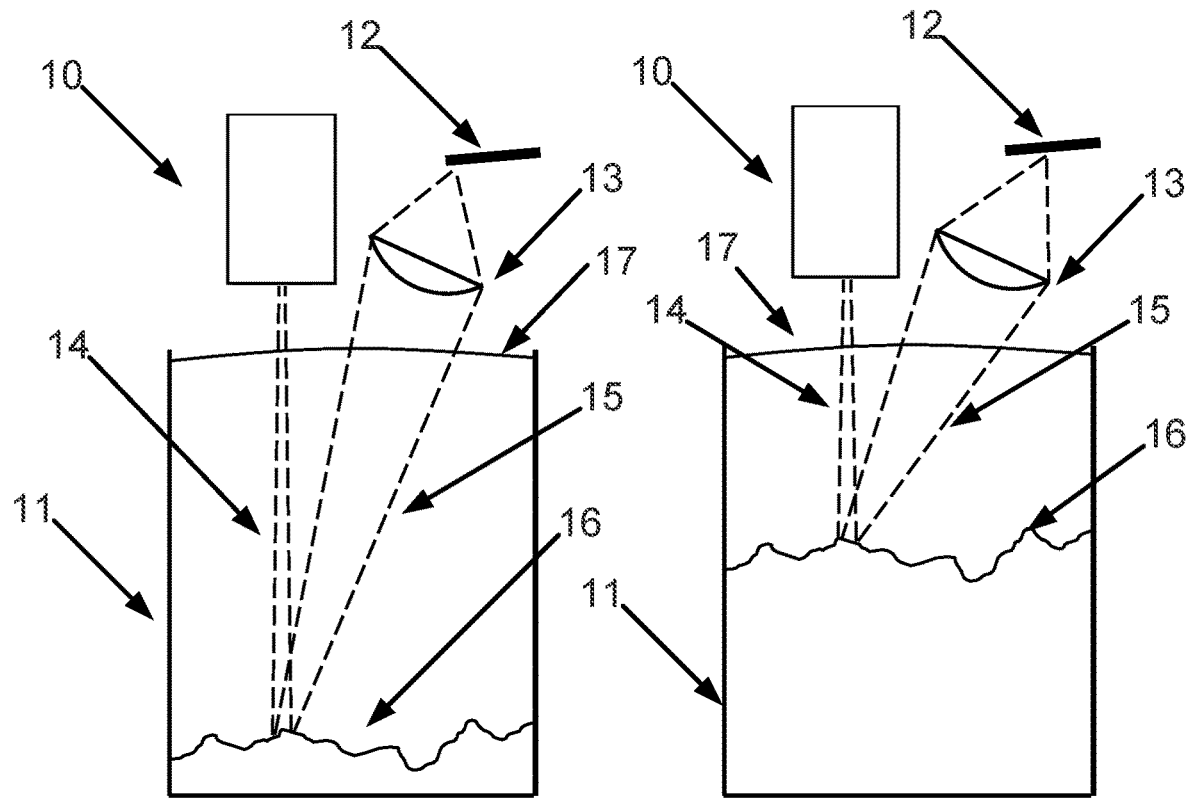
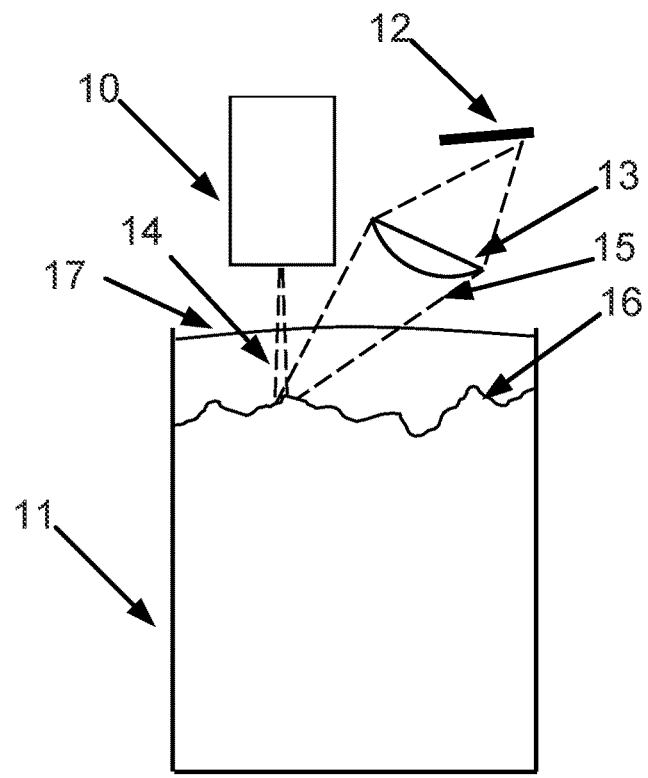
Fig. 1A
Fig. 1B
Fig. 1C

US 11,674,898 B2

SYSTEM AND METHOD FOR DETERMINING A GAS CONCENTRATION IN A CONTAINER

CROSS-REFERENCE TO RELATED APPLICATIONS

This application is the U.S. National Phase under 35 U.S.C. § 371 of International Application No. PCT/EP2019/076665, filed Oct. 1, 2019 entitled "A SYSTEM AND METHOD FOR DETERMINING A GAS CONCENTRATION IN A CONTAINER", which claims priority to Swedish Patent Application No. 1851175-8, filed on Oct. 1, 2018, entitled "A SYSTEM AND METHOD FOR DETERMINING A GAS CONCENTRATION IN A CONTAINER".

BACKGROUND OF THE INVENTION

Field of the Invention

This disclosure pertains to a method and system for performing an optical absorption measurement to determining a concentration of at least one gas in a volume. Especially the disclosure relates to determining the distance through the gas.

Description of the Prior Art

One powerful method to perform an optical absorption measurement is tunable diode laser absorption spectroscopy (TDLAS). In TDLAS a tunable diode laser is used. The laser has a very narrow band output, meaning that the light has a very narrow distribution of wavelengths in the light output, practically meaning that at any instance only a single wavelength is emitted. The light from a tunable diode laser can on the other hand be tuned in wavelength so that it can be scanned across an absorption peak of a desired gas species, for example oxygen. Tuning the wavelength across the gas absorption peak very rapidly, and detecting a decreased intensity transmitted through the gas volume, at time instances when the wavelength matches the absorption line, thus enables gas absorption measurements.

In a TDLAS measurement, it is needed to know the path length through gas. In some examples this is simply achieved by for example knowing the width of a container which the light is sent through. In some applications it is instead favorable to emit the light into a volume, where the light is reflected back towards a detector which is placed on the same side of the sample as the laser. If this reflection occurs at a known distance, the optical path length can be known, and the gas species concentration can be calculated. The reflection can for example occur at a side wall/bottom of a container, its content, or on a mirror or other object.

In some applications it is not possible to know the distance to the reflection, or refraction, point on beforehand. One example may be when the light reflection occurs on the surface of a content in a container, for example the surface of a food product in a tray. The light absorption can then be measured with TDLAS, but it is not possible to calculate the gas species concentration since the path length is unknown. In many applications it is not possible to open the container to measure the distance with for example a ruler or calliper, instead non-intrusive stand-off methods need to be used, for example radar, ultrasound ranging, stereo vision, lidar (light detection and ranging) or laser triangulation.

One possibility to obtain the path length in situations when this is not trivial to measure, is to use normalization using a reference gas with known concentration. Through the known absorption, the path length for the reference gas may be retrieved, and by assuming the light probing the reference gas and gas with an unknown concentration have the same path lengths, the concentration of the primary gas is obtained. The reference gas may be of natural origin (like water vapor which has a known concentration if the relative humidity and temperature are known), or it may be intentionally added.

TDLAS has previously been combined with distance sensors in order to calculate concentrations, for example in U.S. Pat. No. 8,994,948 and EP 3004820. These described systems require extra components and overlapping positions to obtain separate measurements which also means that the measurements may not be performed on the same geometry which may lead to that not the correct distance may be determined.

Hence, new improved apparatus and methods for determining a path length through a gas in a container would be advantageous.

SUMMARY OF THE DISCLOSURE

Accordingly, embodiments of the present disclosure preferably seek to mitigate, alleviate or eliminate one or more deficiencies, disadvantages or issues in the art, such as the above-identified, singly or in any combination by providing a system or method according to the appended patent claims for non-destructively determining the integrity of sealed containers by transmitting light over an outer surface of at least one side of the container.

In some aspects of the disclosure, a method of determining a concentration of at least one gas in a container is described. The method may include transmitting light from a light source through a volume of the at least one gas located inside the container. The method may further comprise, detecting light reflected by a surface inside or behind the container, or light refracted or scattered by the container, with a detector. The detector may provide a first signal related to an intensity of the reflected light, and a second signal related to a position of reflected light being detected. The method may further include, determining an absorption of the at least one gas inside the container based on the first signal. The method may also include determining a distance that light travels through the container based on the second signal. Further, the method may include estimating a concentration of the at least one gas inside the container which may be based on the absorption and the distance.

In some examples of the disclosure, the method further includes determining the distance from a point on the surface reflecting the light. In another example, the method includes determining the distance from a distribution of points reflecting the light.

In some examples of the disclosure, the method includes converting the reflected light into an illumination spot on the detector by at least one lens, or concave mirror. The at least one lens, or concave mirror may be positioned in front of the detector In some examples of the disclosure, the method includes determining the distance based on triangulation, a focus-effect, or on specular reflection.

In some examples of the disclosure, the method includes that the detector may be positioned at an angle compared to an optical axis of the at least one lens, or concave mirror.

In some examples of the disclosure, the method includes focusing the light on the detector for a range of reflection distances by positioning the detector at an angle compared to the optical axis of the at least one lens, or concave mirror.

In some examples of the disclosure, the method includes that the detector may be a position sensitive detector (PSD), an array type detector, or a pixel type detector.

In some examples of the disclosure, the method includes that the second signal may represent light distribution of reflected light on the detector, and wherein more than one distances are determined using the light distribution, such as a distance, or a distribution of distances, to a top film, and a content surface.

In some examples of the disclosure, the method includes that the light source may be a laser emitting a laser beam.

In some examples of the disclosure, the method includes expanding the laser beam in a direction perpendicular to the direction between the laser beam and the detector.

In some examples of the disclosure, the method includes obtaining the first signal by tunable diode laser absorption spectroscopy.

In another aspect of the disclosure, a system for determining a concentration of at least one gas in a container is described. The system may include a light source for transmitting light through a volume of the at least one gas located inside the container. The system may further include a detector for detecting light reflected by a surface inside or behind the container, or light refracted or scattered by the container. The detector may provide a first signal related to an intensity of the reflected light, and a second signal related to a position of reflected light being detected. The system may also include a control unit for determining an absorption of the at least one gas inside the container which may be based on the first signal. The control unit may also be determining a distance that light travels in the container, which may be based on the second signal. The control unit may further be estimating a concentration of the at least on gas inside the container, which may be based on the absorption and the distance.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the disclosure are capable of will be apparent and elucidated from the following description of examples of the present disclosure, reference being made to the accompanying drawings, in which:

FIGS. 1A to 1C are illustrating an exemplary arrangement for measuring the distance through at least one gas species;

DESCRIPTION OF EXAMPLES

Figure 2A:
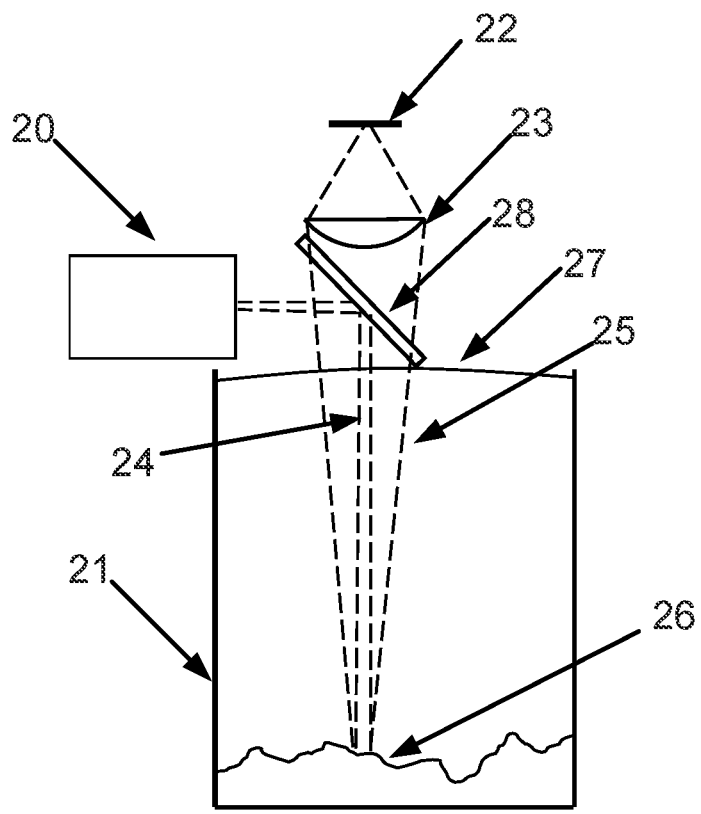
FIGS. 2A and 2B are illustrating another exemplary arrangement for measuring the distance through at least one gas species.

Specific examples of the disclosure will now be described with reference to the accompanying drawings. This disclosure may, however, be embodied in many different forms and should not be construed as limited to the examples set forth herein; rather, these examples are provided so that this disclosure will be thorough and complete, and will fully convey the scope of the disclosure to those skilled in the art.

The following disclosure focuses on examples of the present disclosure applicable to determine a distance through a gas for calculation of a concentration of the gas by obtaining at least one distance between the detector and at least the surface in which the light is reflected, refracted or scattered, using the same detector as used for detecting the intensity of the reflected light. The disclosure generally relates to measurements on containers.

A container may have at least one flexible wall or be a container with an unpredictable path length due to, for example, the arrangement of the content in the container. Examples of such containers, but not limited to, are flexible bags, e.g. bags made of plastic, or a tray closed with, for example, a covering foil, such as cling films or plastic wrap. The tray may also be closed with a lid that may be elastic, or have different degrees of rigidity, such as semi-rigid or rigid. Trays are usually made of semi-rigid or rigid plastic and are commonly used for food stuff. Alternatively, in some examples may the container be a bottle, a can, a vial, a container made of carton. The measurements may be non-destructive.

The disclosed methods and systems are all possible to implement in off-line measurements, for example on samples not moving, and in in-line implementations. In-line implementations may for example be measurements on moving containers in production lines, packaging lines, etc. In-line implementations may also include examples where the container is temporary still during the measurement.

An advantage of using the same detector for determining both the distance, such as the path length through the gas, and the intensity, which will give the absorption of the gas, of the reflected light is that the number of components in the complete system may be reduced and that the complexity of the full system may be reduced. The need for overlapping positions for two separate measurements may also be eliminated. Another advantage is that exactly the same geometry, and exactly the same individual photons, may be used for both distance and absorption measurements, such as TDLAS measurement. Meaning that exactly the correct distance may be determined, even if the sample would, for example, be moved during the integration time of the measurement. If the surface is very uneven, so that the reflection occurs from a distribution of heights within the illuminated area, still the correct average distance would be measured.

An additional advantage is that by using the same photons to measure the optical path length and the absorption signal means each detected signal get weighted correctly and an effective distance is measured exactly compared to a parallel system detecting own photons and estimating a path length.

A container may be a closed bag or closed tray that includes at least one species of a gas, Examples may be containers having a modified atmosphere (MAP). Modified atmosphere is commonly used in packages in order to improve the shelf life, for example in food packages, drugs, etc. gases commonly used are carbon dioxide ($CO_2$) or nitrogen ($N_2$) to lower the amount of oxygen ($O_2$). This is made in order to slow down growth of aerobic organisms and prevent oxidation reactions. Hence it is important to monitor these packages and make sure that there is no leakage, for example during packaging. Apart from carbon dioxide ($CO_2$) and oxygen ($O_2$), other gases can be monitored as well, depending on the container and the product, for example water vapor (H2O) may be of interest for certain products.

However, it will be appreciated for the person skilled in the art that the description is not limited to this application but may be applied to many other systems where the concentration of gases may need to be measured.

Measuring gas concentrations using optical absorption measurements is common in many applications, especially when a non-intrusive measurement is desired. Light is transmitted through a volume where an unknown concentration of at least one gas species is present, and a detector detects the light that has passed through the volume. The light absorption by the at least one gas species in the volume leads to a decreased light intensity at a specific wavelength, or a set of wavelengths, at which the at least one gas species absorbs light. The amount of absorption is dependent on the concentration of the gas and the optical path length through the volume. This relationship is commonly described by the Beer-Lambert Law, $$I(\lambda)/I0(\lambda) = \exp(-\sigma(\lambda) \times c \times L).$$

Where $\lambda$ is the wavelength I is the detected intensity, IO is the intensity without absorption, $\sigma$ is the absorption coefficient, c is the concentration and L is the optical path length.

Thus, to be able to calculate the concentration of at least one gas species from an absorption measurement, the path length, L, is needed.

The Beer-Lambert law states that the gas absorption, which is the primarily measured quantity in a TDLAS measurement, is related to the product of the path length and the concentration. Therefore, the path length needs to be defined in order to calculate the correct gas concentration.

When measuring gas concentration of at least one gas species in a volume, for example, a container, reflected or back scattered light may be utilized. Light is emitted by a light source. The light source may be a white light source or at least one laser source, such as a diode laser, a semiconductor laser. In a preferred example, the light source is a tunable diode laser. The light from the light source may be emitted towards the volume containing unknown concertation of at least one gas species and transmitted through the volume of gas. The transmitted light is then reflected or backscattered in a surface which may either be a content inside the volume or surface of the container holding the volume. The volume may be a headspace.

If the surface is uneven it may be important to measure a distance to exactly the same spot that the light, such as the laser light of a TDLAS measurement, is reflected at to get the correct distance. Hence improve the accuracy of the calculation of the concentration of the at least one gas species in the volume.

It may therefore be advantageous to use the same light source and the same detector to perform both the distance measurement and absorption measurements, such as the TDLAS measurement. Another advantage of using the same light source, is that the number of components in the complete system may be reduced and the complexity of the full system may be reduced. Also, the need to overlap the positions for the two separate measurements would be eliminated. A further important advantage of using the same light source, as described herein, is that exactly the same geometry, and in fact exactly the same individual photons, will be used for both distance and absorption measurements, such as TDLAS measurement, meaning that exactly the correct distance will be sensed, even if the sample would, for example, be moved during the integration time of the measurement. If the surface is very uneven so that the reflection occurs from a distribution of heights within the illuminated area, still the correct average distance would be measured by using the system and method described herein.

Figure 3A:
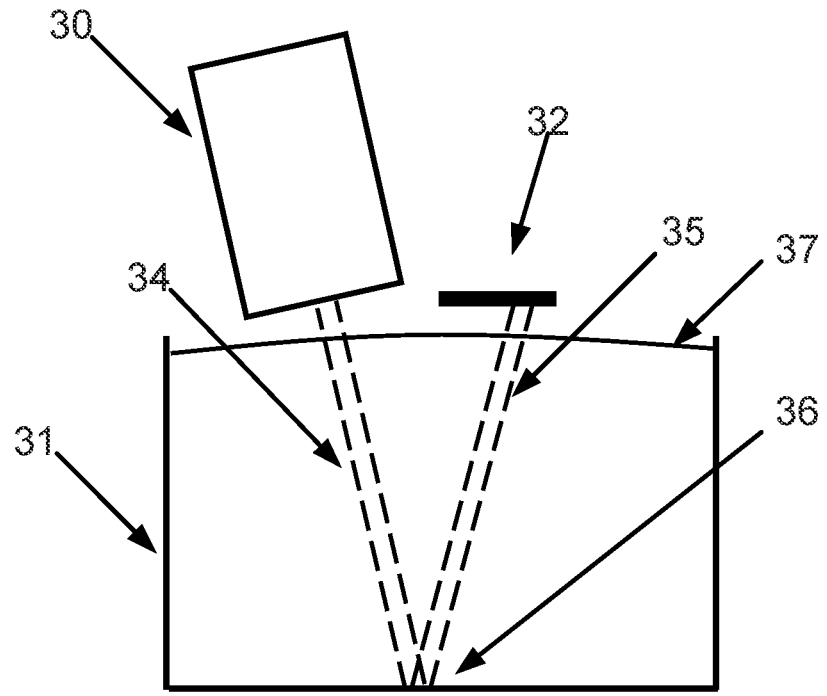
FIGS. 3A and 3B are illustrating a further exemplary arrangement for measuring the distance through at least one gas species.
Figure 3B:
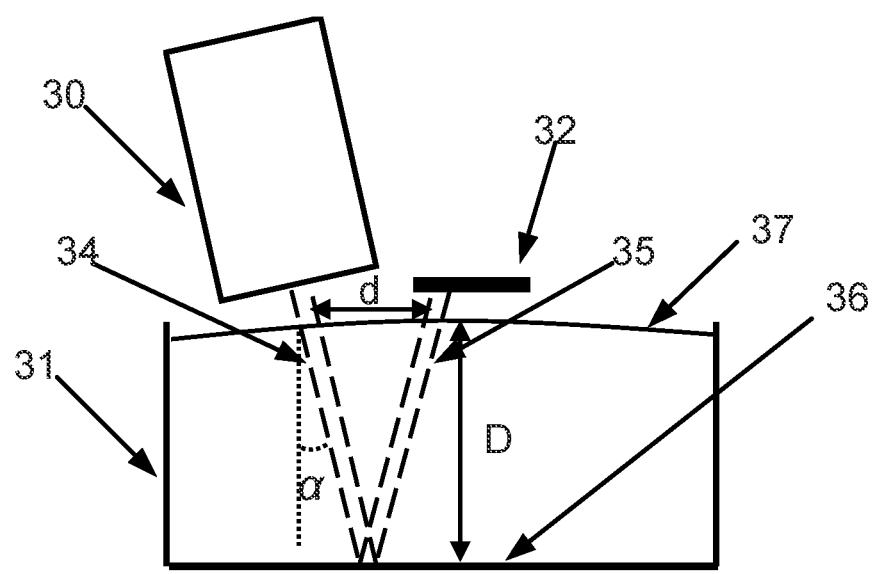

FIGS. 3A and 3B are illustrating one example of how a distance measurement and an absorption measurement, such as a TDLAS measurement, may be combined using the same laser 30 and detector 32, and performed at the same time. FIGS. 3A and 3B are illustrating an example when a reflection occurs at a well-defined, planar, surface 36 located inside the container 31. The surface 36 may be an inside wall of the container 31 but could also, in some examples, be a surface of a content inside the container or a reflective material arranged inside the container.

In some further example, may the surface be a reflective surface on which the container 31 is arranged. The reflective surface may be a mirror or a polished metal surface, or any other type of reflective material. In this example, the position of the reflective surface may be known and the distance through the volume may be determined by determining the position of the wall, lid or foil 37 through which the light is transmitted.

Alternatively, the distance between a surface 36 of the container 31 and the surface located behind this surface 36 may be unknown. Then this distance may be determined using a similar method related as described herein.

In the illustrated example of FIGS. 3A and 3B, the container 31 is here illustrated as a container 31 with at least one wall being slightly curved, i.e. the top wall 37, due to a difference in the pressure between the inside gas and the surrounding environment. The top wall 37 may in some examples be made of a more rigid material that does nor bend or curve due to a difference in pressure. The system may also be arranged to transmit light through any of the other walls of the container 31.

The light source 30 emits light 34. The emitted light may have at least one discrete wavelength or emits light in a range of wavelengths. The used wavelengths are selected to match the absorption spectra of at least one species of a gas inside the container 31.

The detector 32 is configured to provide a first signal related to an intensity of light reflected 35 from the surface 36, and a second signal related to a position of reflected light being detected.

The emitted light is transmitted through a wall, lid or foil, 37 of the container 31, and through a volume of the at least one gas species inside the container 31. If the planar surface 36 is illuminated by a laser beam 34 at an angle $\alpha$, the reflected light 35 may be shifted sideways at the position of the detector 32, depending on the distance to the reflection. The shifting is illustrated in FIGS. 3A and 3B as a difference in where the reflected light 35 is detected by the detector 32. In FIG. 3A the light is, as an example, illustrated to be detected further to the right on the detector 32 than in FIG. 3B. This shift is due to the difference in the distance D between FIG. 3A and FIG. 3B. Distance D may be defined as the distance between surface 36 and the wall, lid or foil 37 through which the emitted light 34 is transmitted.

As an example, if the laser beam 34 is transmitted at an angle $\alpha$ from perpendicular to the surface of the reflection surface 36, the spot on a detector 32 may be a distance, $d = 2 * \tan(\alpha) * D$, from the laser beam 34. Meaning that the distance D may be calculated as $D = d/(2 * \tan(\alpha))$. The total path through gas with unknown concertation is then given as $2*D/\cos(\alpha)$.

The light source 30 and the detector 32 may be arranged as two separate units. Alternatively, the light source 30 and the detector 32 may be arranged in a common housing (not illustrated) having an opening in the housing or a window which may be transparent or translucent for the at least one wavelength emitted by the light source 30. The distance between the opening or the window and the light source 30 and detector 32 may be known. The light source 30 and the detector 32 may be arranged at a distance from or adjacent the wall, lid or foil 37, through which the light is transmitted. In some examples are the light source 30 and the detector 32 arranged to abut the wall, lid or foil 37.

In another example is the window of a common housing arranged to abut the wall, lid or foil 37, through which the light is transmitted.

When arranging the light source 30 and the detector 32, or a common housing, to abut the wall, lid or foil 37, the part abutting the wall, lid or foil 37 may be defined as a reference point when determining distance D. Hence, distance D may be defined as the distance between the inner surface 36 and the reference point since this distance may be the same as the distance between the inner surface and the abutted wall, lid or foil 37.

When a common housing is used, the distance D may then be calculated by subtracting the known distance between the detector 32 and the opening or window abutting the wall, lid or foil 37, and the determined distance between the surface 36 and the detector 32.

In another alternative may the light source 30 and the detector 32 be connected to a mechanical fixture, such as a beam or a frame, that is arrangeable to abut the wall, lid or foil 37. Using a mechanical fixture may also provide a reference point when determining the distance D. The light source 30 and the detector 32 may be attached directly to the mechanical fixture, thus the distance D between the surface 36 and the wall, lid or foil 37 will be approximately the same as the distance between the surface 36 and the detector 32.

In cases where the wall, lid or foil 37 is flexible, it may bulge, be concave, or crease due to, for example, differences in the pressure between the volume inside the container 31 and the pressure outside the container 31. In those cases, it may be an advantage to use an arrangement that abuts the wall, lid or foil 37 through which the light is transmitted, to make the wall, lid or foil 37 even or flat to better define distance D between the inner surface 36 and the wall, lid or foil 37.

Another example is to determine two distances, for example, a distance between the detector 32 and the wall, lid or foil 37, through detecting a reflection in the wall, lid or foil 37, and the distance between the inner surface 36 and the detector 32. Also, from a visibly transparent foil there will always be a fractional reflection; usually in the order of a few percent of the light is reflected. By calculating these two distances, the distance D between surface 36 and the wall, lid or foil 37, through which the emitted light 34 is transmitted can be determined.

Two or more reflection distances may be determined using the second signal on the detector. If partial reflection occurs at several different distances, there will be several local maxima in the intensity distribution across the detector surface. The position of these local maxima on the detector surface may be used to obtain several reflection distances, for example the distance to the wall, lid or foil 37, and a reflection on an inner surface in the container.

Alternatively, the distance from the detector to the wall, lid or foil 37, may be determined by other means or devices. In some examples the position of the wall, lid or foil 37 may be known since it always has the same position, for example on a rigid container. In some examples the position of the wall, lid or foil 37 may be known by another measurement, such as using a distance sensor based on, for example, ultrasound, radar, laser triangulation, vision systems, etc. In other examples, the wall, lid or foil 37 may be fixated in position by other means, as, for example, suction cups.

Another example is that a divergent light beam, such as a laser beam, is illuminating a planar surface. The width of the reflected beam, at a position of a detector, would then depend on the distance to the reflection point.

FIGS. 1A to 1C are illustrating a further example, where a lens 13, the lens may in some examples be part of a lens system, is placed in front of the detector 12, and so called triangulation may be used to obtain the distance between the surface 16 and the wall, lid or foil 17 of container 11 which holds the volume of at least one gas species through which the emitted light 14 is transmitted. This principle behind triangularization is used in many industrial distance sensors but the information here related to the position and the intensity of the reflected light is obtained from a single sensor, similar as described in relation to FIGS. 3A and 3B. The system in FIGS. 1A to 1C, may be arranged in relation to the container in a similar way as described for FIGS. 3A and 3B.

Alternatively, instead of a lens, a concave mirror may be used.

The lens 13 and detector 12 may be placed some distance away from the optical axis of the light beam 14, such as a laser beam. The position of the focus of the reflected light 15 from the reflection point on the surface 16, by the lens 13, on the detector 12, may depend on the distance to the reflection point, illustrated in FIGS. 1A to 1C by shift towards right on the detector with a decreasing distance between the inner surface 16 and the wall, lid or foil 17 of container 11. In this case the reflection may occur also on a diffuse surface. In FIGS. 1A to 1C, the detector 12 and lens 13 are positioned, not only to give the triangulation effect, but also in order to have a good focus on the detector 12 at all reflection distances (within the detection range).

In one example, to improve the accuracy of the distance measurement, i.e. have an improved resolution, it may be an advantage to have an emitted light beam 14, such as a laser beam, that has a narrow spread in the direction towards the detector 12. In some examples, a large illumination spot on the surface 16 in which the light is reflected, may be desirable. This may be provided by having the incident light beam 14 to be shaped into a light sheet. A light sheet may be provided by having a narrow spread in the direction towards the detector 12 and at the same time expanded the beam in a perpendicular direction.

A light sheet may be archived by a cylindrical lens arranged in front of the light source 10, or by other optical components, such as special diffusers that are engineered to give a desired light spread profile. Another option is to scan the surface 16 in the direction of the spread of the light sheet with a narrow light beam 14, for example by with a moving mirror combined with a lens system including a scan lens or an objective.

It is possible to calculate analytically the distance to a reflection point on surface 16 from the average light spot position on a surface of detector 12, given the placements of the light beam 14, such as a laser beam, lens 13 and detector 12. However, in practice it is most efficient to make a calibration measurement series where the average light spot position (or any output signal related to the position) on the detector is noted for a number of known reflection distances, and a numerical fit is used to relate these data. In this way imperfections of the component placement, etc., are compensated for.

Figure 2B:
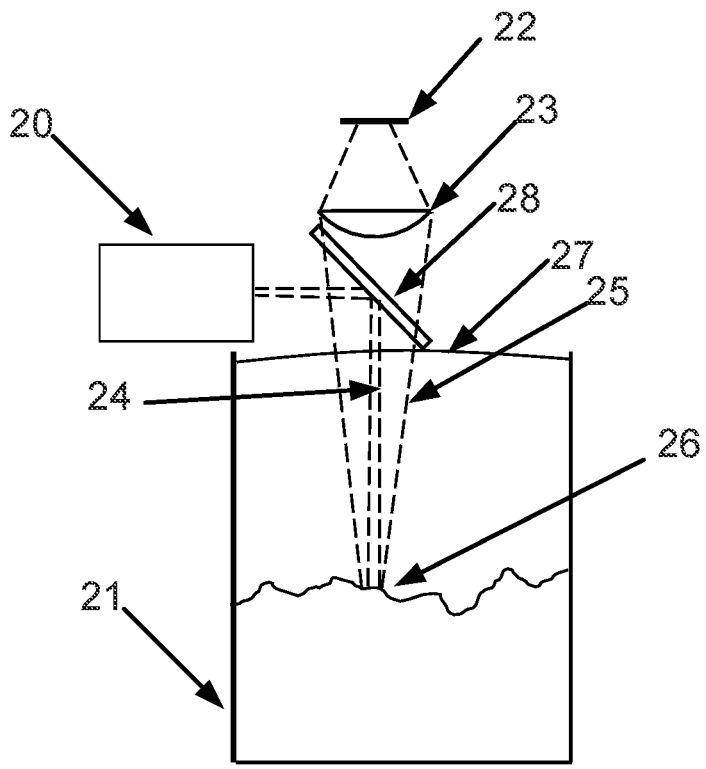

FIGS. 2A and 2B are illustrating an example where the collection lens 23 is placed on the same optical axis as the illumination light 24, such as a laser beam. The collection lens 23 may be part of a lens system. The light is emitted from light source 20 and is reflected by a semitransparent mirror 28 and transmitted through a wall, lid or foil 27 of a container 21 and further through the volume of at least one gas with an unknown concentration. The light is reflected in a surface inside the container 26 and reflected back. The reflected light 25 is transmitted through the semitransparent mirror 28 and focused on the detector 22 by a collection lens 23. The collection lens 23 may give a perfect focus of the reflected light 25 at a certain reflection distance. When the reflection occurs at another distance, the focus will be more and more "blurry"/spread out, the further away from this distance the reflection occurs.

This is illustrated in FIGS. 2A and 2B as broadening of the light collected by the detector 22, where FIG. 1A has a small focused spot, while FIG. 2B has a broader more unfocused spot on the detector 22. By measuring the size, or full shape, of the light spot on the detector, it is thus possible to obtain information about the reflection distance. This example is related to confocal spectroscopy where the collection lens is moved in order to favor light collection from a certain reflection distance.

To relate the size of the light spot on the detector 22 to the distance to the reflection point on surface 26 it may be most efficient to perform a calibration measurement series. A chosen output signal, for example the full width at half max (FWHM) of the intensity, related to the light spot size, is then noted for a number of known reflection distances. A numerical fit is then used to relate these data. In the calibration measurements, it may sometimes be favorable to use a surface with similar optical characteristics (regarding diffusivity, color, reflectance), as the intended application. The collection lens 23 may be replaced by an angled concave mirror. The semi-transparent mirror 28 may then be removed and the light beam 24 may be transmitted through a hole in the mirror.

The system described in relation to FIGS. 2A and 2B, is similar as described in relation to FIGS. 3A and 3B except that the system in FIGS. 2A and 2B relies on a focus-effect instead of the direct specular reflected light. The system in FIGS. 2A and 2B, may be arranged in relation to the container in a similar way as described for FIGS. 3A and 3B.

The path length may also be determined with the disclosed method or system in situations when the light is not reflected back towards the detector, but is instead transmitted through the container, onto the detector. In some examples, as for example measurements on cylindrical containers, as for example bottles cans or vials, the light beam may be displaced sideways due to light refraction in the walls of the container.

In this example, the amount of displacement depends on exactly where on the cylindrical container, compared to the center of the container, the light beam is transmitted. The light beam displacement may be measured using the second signal from the detector, and thus information regarding the position of the light beam compared to the position of the container is obtained. The optical path through the container is dependent on this relationship and thus the optical path length may be measured using the second signal of the detector, also in transmission. Other examples may also be relevant where the second signal from the detector gives information on the optical path length through the gas in a transmission geometry. These other examples may include light scattering or other examples of light refraction.

Figure 4A:
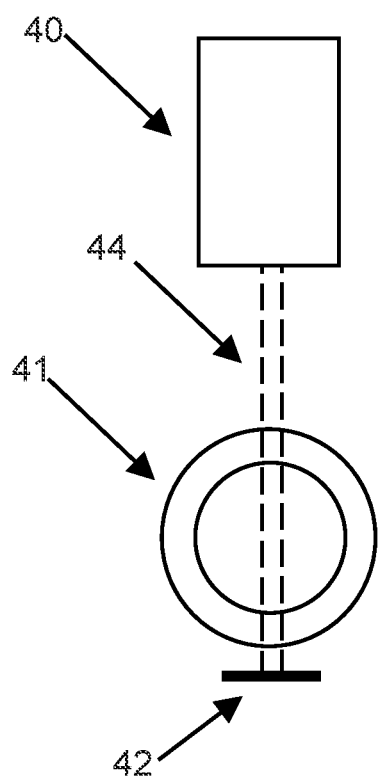
FIGS. 4A and 4B are illustrating an example where a transmission arrangement may be used to determine a distance through least one gas species in a cylindrical container.
Figure 4B:
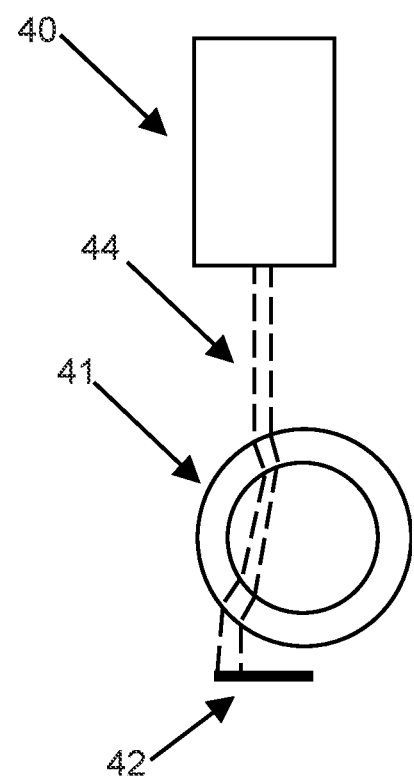

FIGS. 4A and 4B are illustrating an example where the second signal from the detector 42 is used to determine a distance through the gas in a cylindrical container 41, for example a bottle neck or vial, by measuring the displacement of a transmitted light beam 44. The light source 40 may emit a collimated light beam 44. If, as in FIG. 4A, the light beam 44 passes through the center of the container 41 the light beam 44 may not be deflected. FIG. 4B shows an example where the light beam 44 passes on the edge of the container 41. The light beam 44 may then be displaced by the refraction in the walls of the container 41, and may therefore be hitting the detector 42 at another position.

It is possible to analytically calculate the position on the detector for different positions on the container. However, in many cases it is most efficient to make a calibration series of measurements where, for example, the path length through gas is noted for a number of light positions on the detector. A numerical fit may then be used to relate these data.

There are also other examples where the refraction of a light beam transmitted through the container is characterized by using a position sensitive detector. Examples may include containers with other than cylindrical shape.

In a TDLAS measurement it is common to use a photodiode as detector, for example a PIN photodiode. Typical materials are Si and InGaAs. The detectors generally give an output current that is proportional to the light power illuminating the surface of the detector. These detectors are suitable for a TDLAS measurement, but they do not give any information about the position on the detector that light is detected.

A detector type that is very similar to a normal TDLAS photodiode is a so called position sensitive detector (PSD). These detectors have more than one outputs for current (anodes)—a 1D PSD normally has two current outputs and a 2D PSD normally has four current outputs. The total current from these anodes is proportional to the total light power, just like for a common photodiode, while the distribution of current between the different anodes give information about the position of light in the detector. Using a PSD for a TDLAS measurement would therefore enable a TDLAS measurement to be performed (using the total current), while at the same time giving position information.

Another detector type that would be possible to use in this type of combinatory measurement is pixel-based detectors, such as a CCD detector or a CMOS detector. The advantage of these, compared to a PSD, is that they can provide the full distribution of light across the surface of the detector. A PSD is only giving the average position of the light on the surface.

Another option is to use an array detector, such as an array detector which may comprise of at least one column of discrete detectors on an integrated circuit chip. For example, a linear Photodiode Array Detectors (PDA). Linear PDA may be provided both as 1D arrays or as 2D arrays.

All determinations or calculations described herein may be performed by a control unit or a data processing device (not illustrated) connected to the detector.

The control unit or data processing device may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc., as well as one or more data acquisition devices, such as an A/D converter. The special-purpose software may be provided to the control unit or data processing device on any suitable computer-readable medium, including a record medium and a read-only memory.

Figure 5:
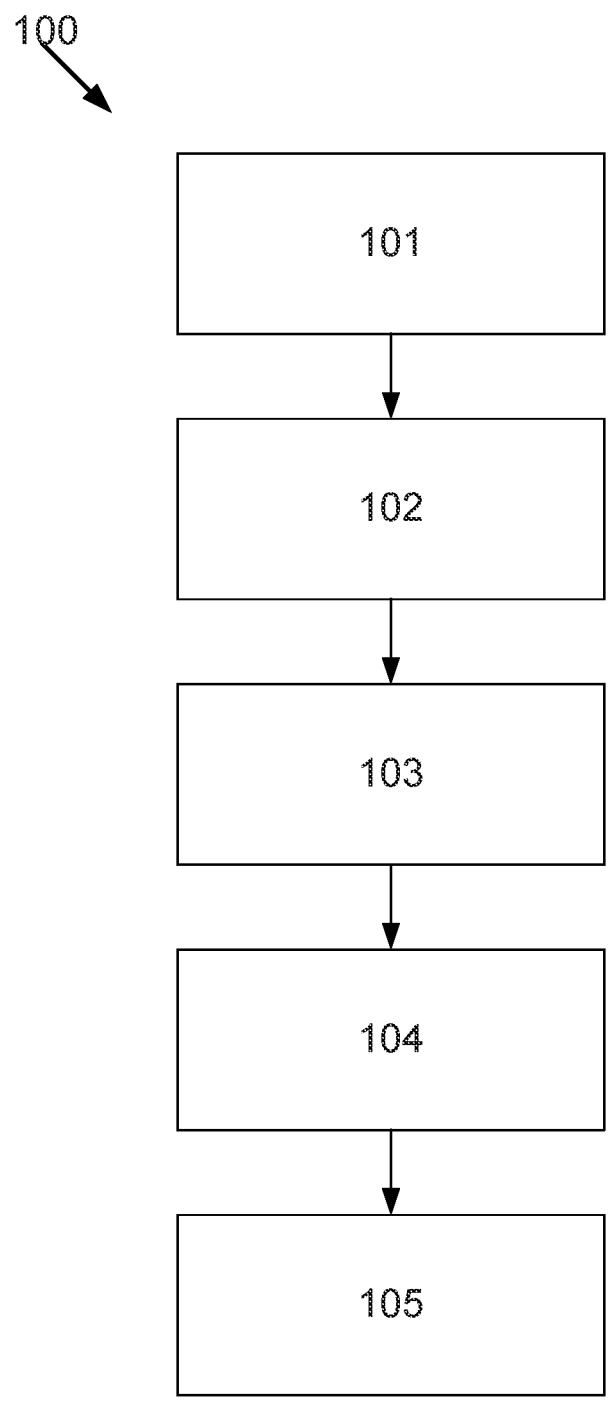
FIG. 5 is illustrating a schematic method according to the disclosure.

FIG. 5 is illustrating a schematic work flow for an example of a method 100 of determining a concentration of at least one gas in a container elated to the herein described systems. The method may include transmitting light 101 from a light source through a volume of the at least one gas located inside the container; and detecting light 102 reflected by a surface inside or behind the container, or light refracted or scattered by the container, with a detector, wherein the detector detects provides a first signal related to an intensity of the reflected light, and a second signal related to a position of reflected light being detected.

The method may further include, determining an absorption 103 of the at least one gas inside the container based on the first signal; and determining a distance 104 between the surface in which the light is reflected, or refracted or scattered, and the detector based on the second signal.

The method may further include estimating a concentration 105 of the at least one gas inside the container, based on the absorption and the distance.

The present invention has been described above with reference to specific examples. However, other examples than the above described are equally possible within the scope of the disclosure. Different method steps than those described above, performing the method by hardware or software, may be provided within the scope of the invention. The different features and steps of the invention may be combined in other combinations than those described. The scope of the disclosure is only limited by the appended patent claims.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

The invention claimed is:

1. A method of determining a concentration of at least one gas in a container, the method comprising:
   transmitting light from a light source through a volume of the at least one gas located inside the container;
   detecting light reflected by a surface inside or behind the container, or light refracted or scattered by the container, with a detector, wherein the detector comprises a position sensitive detector (PSD) and is configured to provide a first signal related to an intensity of the light reflected by the surface or light refracted or scattered by the container, and a second signal related to a position of reflected, refracted or scattered light being detected;
   determining an absorption of the at least one gas inside the container based on the first signal;
   determining a distance that light travels through said container based on the second signal; and
   estimating a concentration of the at least one gas inside the container, based on the absorption and the distance.

2. The method of claim 1, comprising determining the distance from a point on the surface reflecting the light, or from a distribution of points reflecting the light.

3. The method of claim 1, comprising converting the reflected light into an illumination spot on the detector by at least one lens, or concave mirror.

4. The method of claim 3, wherein the detector is positioned at an angle compared to an optical axis of the at least one lens, or concave mirror.

5. The method of claim 4, comprising focusing the light on the detector for a range of reflection distances by positioning the detector at the angle compared to the optical axis of the at least one lens, or concave mirror.

6. The method of claim 3, wherein converting the reflected light into an illumination spot comprises positioning the at least one lens or concave mirror in front of the detector.

7. The method of claim 1, wherein determining the distance of the reflected light is based on triangulation, a focus-effect, or on specular reflection.

8. The method of claim 1, wherein the second signal represents light distribution of reflected light on the detector, and wherein more than one distances are determined using the light distribution.

9. The method of claim 8, wherein the one or more distances comprises a distance, or a distribution of distances, to a top film, and a content surface.

10. The method of claim 1, wherein the light source is a laser emitting a laser beam.

11. The method of claim 10, expanding the laser beam in a direction perpendicular to the direction between the laser beam and the detector.

12. The method of claim 1, comprising obtaining the first signal by tunable diode laser absorption spectroscopy.

13. A system for determining a concentration of at least one gas in a container, the system comprising:
   a light source for transmitting light through a volume of the at least one gas located inside the container;
   a detector for detecting light reflected by a surface inside or behind the container, or light refracted or scattered by the container, wherein the detector is a position sensitive detector (PSD) and provides a first signal related to an intensity of the reflected, refracted or scattered light, and a second signal related to a position of reflected, refracted or scattered light being detected;

a data processing device for determining an absorption of the at least one gas inside the container based on the first signal; determining a distance that light travels in the container, based on the second signal; and estimating a concentration of the at least one gas inside the container, based on the absorption and the distance.

\* \* \* \* \*

UNITED STATES PATENT AND TRADEMARK OFFICE
CERTIFICATE OF CORRECTION

| | |
|---|---|
| PATENT NO. | : 11,674,898 B2 |
| APPLICATION NO. | : 17/281938 |
| DATED | : June 13, 2023 |
| INVENTOR(S) | : Marta Lewander Xu |

It is certified that error appears in the above-identified patent and that said Letters Patent is hereby corrected as shown below:

On the Title Page

Column 1 (Prior Publication Data), insert item (30) as a new field entry below "2021" -- Foreign Application Priority Data Oct. 1, 2018 (SE) ..................... 1851175-8 --.

In the Specification

Column 2, Line 59, delete "detector" and insert -- detector. --.

Column 4, Line 57, delete "gas," and insert -- gas. --.

Column 5, Line 23, delete "IO" and insert -- I0 --.

Signed and Sealed this
Twentieth Day of February, 2024

Katherine Kelly Vidal
*Director of the United States Patent and Trademark Office*